April 23, 1968
E. B. TARRSON
3,379,952
ELECTRIC TOOTHBRUSH WHICH IS RECHARGEABLE WITH
OR WITHOUT A RECHARGING STAND
Filed Aug. 24, 1965
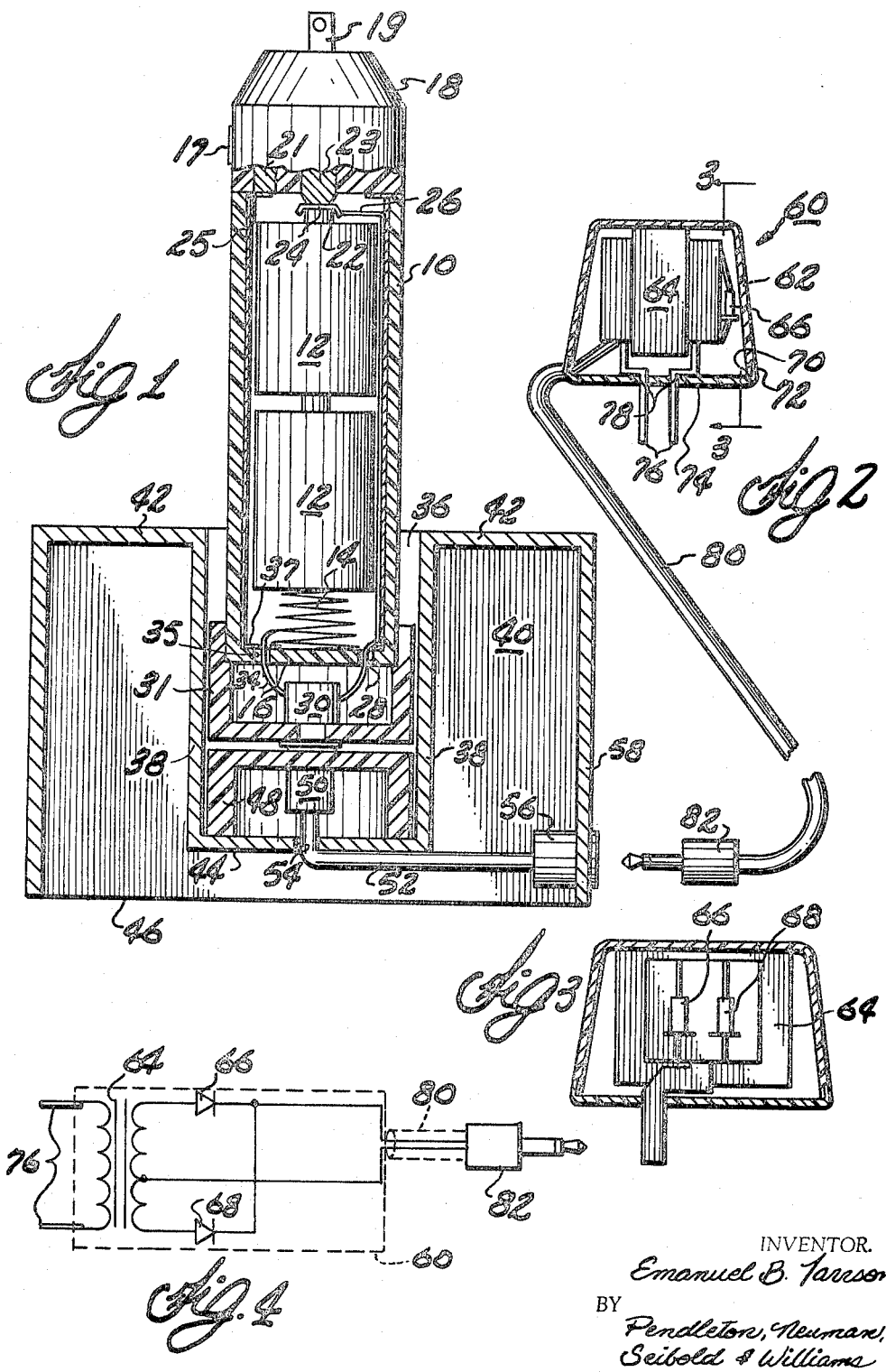
INVENTOR.
Emanuel B. Tarrson
BY
Pendleton, Neuman,
Seibold & Williams
Attorneys

United States Patent Office 3,379,952
Patented Apr. 23, 1968

3,379,952
ELECTRIC TOOTHBRUSH WHICH IS RECHARGEABLE WITH OR WITHOUT A RECHARGING STAND
Emanuel B. Tarrson, Highland Park, Ill.
(540 N. Lake Shore Drive, Chicago, Ill. 60611)
Filed Aug. 24, 1965, Ser. No. 482,252
8 Claims. (Cl. 320—2)

ABSTRACT OF THE DISCLOSURE

An electric toothbrush having a handle with a self-contained rechargeable low voltage power unit, a stand in which the handle may be stored when the toothbrush is not in use, and a low voltage cord adapted to be connected either into the toothbrush handle or into the stand. The low voltage cord has a low voltage power pack at one end with a plug adapted to be inserted into a conventional electrical outlet. When the low voltage cord is connected directly to the handle of the toothbrush, it furnishes power for operating the toothbrush and recharging the power unit. When connected to the stand, the cord supplies electrical power for recharging the power unit when the handle is in the stand

---

This invention relates to electric toothbrushes, and more particularly to such devices employing a self-contained power unit of the rechargeable type.

Several types of electric toothbrushes are known in the art, and all of such units have been designed to effect a compromise among several advantageous and disadvantageous features or modes of operation. Some of the electric toothbrushes of the prior art have been provided with motors designed to operate directly from line voltage, which is normally 120 volts A.C. This type of device can be extremely dangerous, in that it subjects the user to the possibility of electric shock during use of the device, or during its manipulation, if the device, or parts of it, have become damaged or worn, or if the device has been incorrectly manufactured or assembled.

Other prior art devices have been designed in an attempt to overcome this disadvantage, by employing a self-contained low voltage power unit within the handle of the electric toothbrush. In some cases such power units are designed to be recharged by storing the handle of the electric toothbrush in a base containing electrical circuitry for recharging the power unit within it. In this type of apparatus the source of power used for recharging the power unit is connected to the line voltage through a line cord connecting a wall mounted output to the base containing the charging circuit. The electricity within the line cord is at a potential of 120 volts A.C., and while the user is not normally subjected to the possibility of a shock during use of the electric toothbrush, since during that time the unit is disengaged from its base, damage of the line cord or some other circumstance arising from accident or long use of the device may expose persons in the vicinity of the line cord or the base to the threat of an electric shock by the line voltage. Another disadvantage of this electric toothbrush occurs when the brush is subjected to prolonged use, such as, for example, where the brush is used consecutively by several persons or where extended therapy with a stimulator attachment is prescribed for the user. In these cases, the power source will often become prematurely depleted, resulting in an interruption of the use of the brush in order to replenish the power supply by returning the brush to the recharging base.

Inasmuch as electric toothbrushes are normally used in bathrooms under wet conditions, and their bases may be placed in or around lavatories or other supporting surfaces where their line cords or current-carrying parts may come in contact with electrical conductors such as water pipes or the like, these units also represent a danger to the user which it is desirable to overcome.

The danger of electric shock can of course be overcome completely by employing power units such as disposable flashlight batteries or the like, so that no aspect of the device requires that the user be exposed to the possibility of a high voltage shock. The disadvantage inherent in such units, however, is that it is necessary to frequently replace the disposable batteries as they become exhausted, which represents a continuing expense and requires substantial maintenance in purchasing and periodically reinserting fresh batteries.

Accordingly, it is an object of the present invention to provide an electric toothbrush employing a self-contained low voltage power unit which does not normally need to be replaced, together with means for charging the power unit which charging means does not subject the user to the threat of a high voltage shock.

It is a further object of the present invention to provide an electric toothbrush of the type described which may be selectively used either while being powered by the self-contained power unit without any contemporaneous recharging of the units, or while being powered by an external low voltage source which simultaneously charges the self-contained power unit.

It is another object of the present invention to provide an electric toothbrush of the type described which may be employed with a power pack, together with a low voltage cord running between the unit and the power pack, and without any exposed or otherwise available line cord or other electrical components operating at high voltage.

These and other objects and advantages of the present invention will become manifest from the following description and claims, and the accompanying drawings.

In one embodiment of the present invention there is provided an electric toothbrush having a handle containing a self-contained low voltage power unit, and a stand into which the handle may be selectively placed when not in use. The handle and the stand are provided with co-operable electrical connectors which connect the power unit within the handle to a low voltage cord, which is connected at its other end to a low voltage power pack having a plug adapted to be inserted in a conventional electrical wall outlet. The charging circuit for recharging the power unit is disposed in the plug, and the same is surrounded by an insulating casing.

Reference will now be made to the accompanying drawings in which:

FIG. 1 is a front view, partly in cross section, of a toothbrush handle and stand embodying the present invention;

FIG. 2 is an illustration partly in cross section, of a plug and cord assembly of the present invention which is employed selectively with either the stand or the toothbrush handle;

FIG. 3. is a cross-sectional view of the plug unit of the present invention, taken along the line 3—3 of FIG. 2; and FIG. 4 is a schematic circuit diagram of the charging circuit embodied in the plug.

Referring now to FIG. 1 there is illustrated a plastic toothbrush handle 10 in the form of a hollow circular cylinder containing a plurality of batteries 12. A spring 14 is disposed between the end wall 16 of the handle 10 and the lowermost battery 12 to urge the batteries 12 upwardly within the handle 10. Secured to the upper portion of the handle 10 is a motor unit 18, containing a motor (not shown) operative to oscillate an arm 19, to which a brush unit (not shown) may be removably secured.

The terminals of the motor are connected, by means not shown, to conductors 21 and 23 within the motor unit 18, through a slide switch 17 of the type commonly employed in flashlights. The switch 17 could alternatively be a toggle or button type switch. Conductors 21 and 23 are adapted to engage, respectively, a metal sleeve 25, within the handle 10, and a cap 24, snapped onto the terminal 22 of the topmost battery 12.

A flexible wire 26 is connected, at one end, to the cap 24 and extends for the length of the handle 10. The wire 26 passes through an aperture 28 in the end wall 16 and is connected to one terminal of a jack 30 disposed in a plastic case 31 surrounding the bottom of the handle unit 10. The spring 14, which engages a flange 37 connected to the sleeve 25, is connected by a wire 34 to the other terminal of the jack 30, through an aperture 35 in the end wall 16. By the illustrated arrangement the terminals of the motor unit 21 and 23 are respectively electrically connected, through the switch 17, to the two terminals of the jack 30, and the power unit, comprising the batteries 12, is electrically connected in parallel with the terminals of the jack 30.

While it is not illustrated, it will be understood that the cap 24 may be soldered or otherwise permanently affixed to one terminal of the assembly of batteries 12 and the wire 34 may be soldered or otherwise permanently connected to the other terminal. In such cases, the spring 14 is not required.

The case 31 is in the form of a right circular cylinder and is adapted to be received within a hollow cylinder 36 defined by a wall 38 in a stand 40. The stand 40 may be molded of plastic insulating material in any convenient form. The top of the hollow cylinder 36 is defined by a wall 42, and the top of the handle 10 is well above the wall 42 as shown, so that the handle 10 may be easily grasped and removed from the stand.

The lower end of the cylindrical wall 38 is closed with an end wall 44 which is spaced above the lower edge 46 of the stand 40. Within the bottom of the cylinder 36 is secured a cup-like member 48 which supports a plug 50 cooperating with the jack 30. Two wires within a cable or insulated jacket 52 pass through an aperture 54 in the end wall 44, and connect the plug 50 with a jack 56 disposed in a wall 58 of the stand 40.

Referring now to FIG. 2 there is illustrated a plug and connector unit adapted to be used with either the stand 40 or the handle 10. The plug unit 60 comprises a receptacle 62 having the general shape of a hollow truncated quadrilateral pyramid, which contains components including a transformer 64 and a pair of diodes 66 and 68. The edge of the receptacle 62 is provided with a lip 70 which cooperates with a lip 72 disposed on a cover member 74. The two lips 70 and 72 cooperate when the receptacle 62 is assembled to the base 74 to provide a relatively large common area so that the two components of the plug 60 may be securely cemented together. The components within the plug unit 60 are preferably held in place by cementing them to the receptacle 62.

The transformer 64 is of the type having a pair of prongs 76 connected rigidly to the insulating form for the windings of the transformer 64, and insulated therefrom, so that the assembly including the transformer 64 and the prongs 76 comprises a rigid assembly. The prongs 76 pass through the cover 74 through apertures 78, and are tight-fitting in the apertures 78.

The diodes 66 and 68 are secured to the windings of the transformer 64 by tape or the like (not shown) and are insulated therefrom. The diodes are interconnected with the secondary winding of the transformer 64 to serve as a full wave rectifier. The diodes 66 and 68 are connected to one wire within a cable 80, and a center tap on the secondary winding of the transformer 64 is connected to the other wire within the cable 80. The cable 80 extends for a convenient length and terminates in a jack 82 which is identical in size and shape to the jack 50 employed in the stand 40. While jacks 50 and 82 are specifically shown, other equivalent electrical connectors may be used in lieu thereof, such as a shielded double-pronged plug and socket arrangement of the type commonly employed in electric shavers.

Referring now to FIG. 4 there is illustrated a circuit diagram of the components within the plug unit 60, which is indicated by the dashed rectangle identified by numeral 60. The prongs 76 protrude from the plug unit 60 and are interconnected with the primary winding of the transformer 64. The secondary winding of the transformer 64 is provided with a center tap which is connected to one wire within the cable 80, and a pair of diodes 66 and 68 connect the ends of the secondary windings to the other wire within the cable 80. The cable 80 terminates in the jack 82, as described above.

The transformer 64 is a step-down transformer which is designed to transform line voltage of 120 volts to a safe value of voltage, usable for recharging the power unit comprising the batteries 12. The diodes 66 and 68 rectify the alternating current and provide direct current having an RMS value of about 3 to 4 volts. This voltage is furnished via cable 80, either to the stand 40, where it may be employed to recharge the power unit of the toothbrush while the same is in the stand 40, or to the handle 10, where it may be employed to power the motor 18 directly within the handle 10, while recharging the batteries 12. The plug 82 may be connected either to the jack 56 or to the jack 30. In either case there is no exposure of the user, or anyone in the vicinity of the apparatus, to the threat of high voltage electric shock. The only place that voltage of line potential exists within the entire system of the present invention is at the two prongs 76, and the primary winding of the transformer 64 to which the prongs 76 are directly connected. The voltage in the secondary winding of the transformer 64, in the cable 80, or anywhere in the handle 10, is only about 3 or 4 volts, and there is no danger whatever of electrocution or shock at such a low voltage.

Although the particular type of the batteries 12 has not been specified, it will be apparent to those skilled in the art that any series-connected rechargeable power units may be employed, as long as the total voltage has a value which avoids the possibility of dangerous electric shocks. A range of 3.0 to 6.0 volts is preferred, although a somewhat higher voltage may also be used with safety. Preferably, a pair of rechargeable 1.5 volt batteries are employed.

By the foregoing, the present invention has been described with sufficient particularity as to enable others skilled in the art to make and use the same for use under a variety of conditions of service without departing from the essential items of novelty involved which are intended to be defined and secured by the appended claims.

What is claimed is:

1. An electric toothbrush assembly comprising a handle containing a motor and an internal rechargeable energy source for powering the motor; a stand for holding said handle when it is not in use; and a low voltage line cord having one end adapted to be connected alternately to the handle directly and to the handle through the stand, and the other end having an external power unit which is powered with line voltage and which has means for stepping down the line voltage, whereby when said cord is connected to the handle, it provides power to operate the motor and recharge the internal energy source, and when said cord is connected to the stand, it provides power for recharging the internal energy souce while the handle is in the stand.

2. Apparatus according to claim 1 wherein in said external power unit, the means for stepping down the line voltage are adapted to reduce said voltage to about 3 to 4 volts.

3. Apparatus according to claim 1, wherein the exterior surfaces of said handle, stand and external power unit are all formed principally of insulating material.

4. An electric toothbrush assembly comprising a handle containing a motor adapted to power toothbrush attachments, an internal power unit, in series with said motor, and a first jack mounted in a wall of said handle, the terminals of said first jack being connected in parallel with said power unit; a stand adapted to receive said handle having a first plug co-operable with said first jack when said handle is disposed in said stand, a second jack mounted in a wall of said stand, and electrical connecting means interconnecting the terminals of said first plug and said second jack; and an external power unit comprising a stepdown transformer adapted to be connected to an electrical outlet fixture, and an electric cord having one end connected to the secondary winding of said transformer and its other end terminating in a second plug, said second plug being selectively pluggable into either of said jacks, to alternately power said motor when said handle is in use, apart from said stand, and to provide means for recharging said internal power unit when said handle is in said stand.

5. An electric toothbrush assembly comprising an insulating handle containing a motor adapted to power toothbrush attachments, an internal power unit, in series with said motor, and a first jack mounted in a wall of said handle, the terminals of said first jack being connected in parallel with said power unit; an insulating stand adapted to receive said handle having a first plug disposed in the bottom of said receptacle and co-operable with said first jack in said handle when said handle is disposed in said stand, a second jack mounted in a wall of said stand, and electrical connecting means interconnecting the terminals of said first plug and said second jack; and an external power unit comprising an insulating casing housing, a step-down transformer adapted to be connected to an electrical outlet fixture, and an electric cord having one end connected to the secondary winding of said transformer and its other end terminating in a second plug, said second plug being selectively pluggable into either of said jacks, to alternately power said motor when said handle is in use, apart from said stand, and to provide means for recharging said internal power unit when said handle is in said stand.

6. An electric toothbrush assembly comprising an insulating handle containing a motor adapted to power toothbrush attachments, an internal power unit, a switch interconnecting said motor and said power unit in series, and a first jack mounted in a wall of said handle, the terminals of said first jack being connected in parallel with said power unit; an insulating stand having a receptacle to receive said handle conforming to the shape of said handle, a first plug disposed in the bottom of said receptacle and co-operable with said first jack in said handle when said handle is disposed in said receptacle, a second jack mounted in a wall of said stand, and electrical connecting means interconnecting the terminals of said first plug and said second jack; and an external power unit comprising an insulating casing housing, a step-down transformer adapted to be connected to an electrical outlet fixture and an electric cord having one end connected to the secondary winding of said transformer and its other end terminating in a second plug, said second plug being selectively pluggable into either of said jacks, to alternately power said motor when said handle is in use, apart from said stand, and to provide means for recharging said internal power unit when said handle is in said stand.

7. An electric toothbrush assembly comprising an insulating handle containing a motor adapted to power toothbrush attachments, an internal power unit, a switch interconnecting said motor and said power unit in series, and a first jack mounted in a wall of said handle, the terminals of said first jack being connected in parallel with said power unit; an insulating stand having a receptacle to receive said handle conforming to the shape of said handle, a first plug disposed in the bottom of said receptacle and co-operable with said first jack in said handle when said handle is disposed in said receptacle, a second jack mounted in a wall of said stand, and electrical connecting means interconnecting the terminals of said first plug and said second jack; and an external power unit comprising an insulating casing housing, a step-down transformer with the primary winding of the transformer connected directly to an electrical outlet fixture, and an electric cord having one end connected to the secondary winding of said transformer and its other end terminating in a second plug, said second plug being selectively pluggable into either of said jacks, to alternately power said motor when said handle is in use, apart from said stand, and to provide means for recharging said internal power unit when said handle is in said stand.

8. An electric toothbrush assembly comprising an insulating handle containing a motor adapted to power toothbrush attachments, an internal power unit including a pair of series connected rechargeable 1.5 volt batteries, a switch inter-connecting said motor and said power unit in series, and a first jack mounted in a wall of said handle, the terminals of said first jack being connected in parallel with said power unit; an insulating stand having a receptacle to receive said handle conforming to the shape of said handle, a first plug disposed in the bottom of said receptacle and cooperable with said first jack in said handle when said handle is disposed in said receptacle, a second jack mounted in a wall of said stand, and electrical connecting means interconnecting the terminals of said first plug and said second jack; and an external power unit comprising an insulating casing housing, a step-down transformer with the primary winding of the transformer connected directly to a pair of prongs protruding from said casing and adapted to be inserted into an electrical outlet fixture and to thereby support said external power unit, and an electric cord having one end connected to the secondary winding of said transformer and its other end terminating in a second plug, said second plug being selectively pluggable into either of said jacks, to alternately power said motor when said handle is in use, apart from said stand, and to provide means for recharging said internal power unit when said handle is in said stand.

References Cited

UNITED STATES PATENTS

| | | | |
|---|---|---|---|
| 3,089,071 | 5/1963 | Hartwig | 310—47 X |
| 3,143,697 | 4/1964 | Springer | 320—2 |
| 3,214,670 | 10/1965 | Schof | 320—2 |

JOHN F. COUCH, *Primary Examiner.*

S. WEINBERG, *Assistant Examiner.*